(12) United States Patent
Bruas

(10) Patent No.: US 7,366,232 B2
(45) Date of Patent: Apr. 29, 2008

(54) METHOD AND DEVICE FOR THE AUTOMATIC SELECTION OF THE BIT RATE IN HIGH FREQUENCY TRANSMISSIONS

(75) Inventor: Patrick Bruas, Clichy S/S Bois (FR)

(73) Assignee: Thales, Paris (FR)

( * ) Notice: Subject to any disclaimer, the term of this patent is extended or adjusted under 35 U.S.C. 154(b) by 667 days.

(21) Appl. No.: 10/265,696

(22) Filed: Oct. 8, 2002

(65) Prior Publication Data
US 2003/0128749 A1 Jul. 10, 2003

(30) Foreign Application Priority Data
Oct. 9, 2001 (FR) .................................. 01 12979

(51) Int. Cl.
*H04B 1/38* (2006.01)
*H04L 5/16* (2006.01)
(52) U.S. Cl. .................... 375/222; 375/229; 375/230; 375/231; 375/232
(58) Field of Classification Search ......... 375/229–236
See application file for complete search history.

(56) References Cited

U.S. PATENT DOCUMENTS

| | | | |
|---|---|---|---|
| 3,700,820 A | * | 10/1972 | Blasbalg et al. ............. 370/468 |
| 5,434,883 A | * | 7/1995 | Kimoto et al. .............. 375/231 |
| 6,175,550 B1 | * | 1/2001 | van Nee ..................... 370/206 |
| 6,215,818 B1 | * | 4/2001 | Velez et al. ................. 375/233 |
| 6,263,077 B1 | | 7/2001 | Zuranski et al. |
| 6,693,958 B1 | * | 2/2004 | Wang et al. ................. 375/232 |
| 6,760,391 B1 | * | 7/2004 | Alb et al. .................... 375/354 |
| 2002/0105964 A1 | * | 8/2002 | Sommer et al. ............ 370/463 |

FOREIGN PATENT DOCUMENTS

EP 1 085 687 3/2001

OTHER PUBLICATIONS

Christopher Redding, et al., "Adaptive HF Radio Test Results Using Real-Time Channel Evaluation Systems", Military Communications Conference, 1994, MILCOM 94, Conference Record, 1994, IEEE, Oct. 2, 1994, pp. 890-894.

* cited by examiner

*Primary Examiner*—Curtis B. Odom
(74) *Attorney, Agent, or Firm*—Oblon, Spivak, McClelland, Maier & Neustadt, P.C.

(57) ABSTRACT

A method and device for determining at least one traffic parameter in a data transmission system including at least one transmitter and one receiver, wherein the receiver includes a modem with equalizer. The method includes determining at least one piece of data given by the equalizer, wherein the piece of data includes the equalization error $E_i$; and determining one or more traffic parameters in taking account of the data provided, the fixed quality of service QoS and a relationship linking the quality of service and the equalization error $E_i$.

14 Claims, 3 Drawing Sheets

METHOD AND DEVICE FOR THE AUTOMATIC SELECTION OF THE BIT RATE IN HIGH FREQUENCY TRANSMISSIONS

BACKGROUND OF THE INVENTION

1. Field of the Invention

The invention relates to a device and a method for the selection of a traffic parameter such as the bit rate for HF (high frequency) transmissions using a modem with equalizer.

The invention can be applied especially to all HF digital communications using a serial modem with equalizer whatever its waveform and whatever the traffic carried, for example data, digitized voice transmission, traffic in FEC (Forward Error Correction) mode and ARQ (Automatic Request Query) mode, and whatever the type of link, for example links in the half-duplex or full-duplex mode, unicast links or broadcast links etc.

Hereinafter in the description, the expression "traffic parameter" designates one or more parameters from the following list: the frequency, the useful data transmission bit rate, the waveform, the interleaver and/or the power.

Similarly, the expression "propagation parameters" covers for example the SNR (Signal-to-Noise Ratio), the nature and the level of the interference, the Doppler spread, the temporal spread, the dynamic range of the multiple paths, the shift and the Doppler ramp.

In the field of HF digital transmission, propagation by ionospheric reflection uses a non-stationary medium that is extremely fluctuating in time and in space with short-term and long-term variations in propagation parameters, such as those mentioned here above.

The advent of the serial modem (or single-tone modem) with equalizer has made it possible to augment the user bit rate in digital communications. The equalizer can be used to overcome fast variations in the channel and especially the fading of the envelope of the received signal.

The bandwidth of the channel is also variable and the ALE (Automatic Link Establishment) protocols enable the automatic selection of an unoccupied and active frequency in the range between the Lowest Usable Frequency (or LUF) and the Maximum Usable Frequency (or MUF) in order to provide quality of service or QoS at the receiver point, for the data traffic that follows the ALE phase.

Since the transmission medium is variable, the HF transmission mode should be capable of adapting. This implies the selection, at the beginning of the link and during the link, of the traffic parameters best suited to the propagation characteristics of the channel, the noise or the interference (on the receiver side) depending for example on the quality of service required by the user. The selected traffic parameters are especially the frequency, the bit rate, the waveform, the interleaver and/or the power.

2. Description of the Prior Art

To this end, the prior art describes various adaptive procedures that may be classified under several categories depending on the parameter of the traffic that is adapted and the nature of the method, namely the prediction or estimation of the propagation channel.

FIG. 1 gives a diagrammatic view of a prior art method that implements a waveform.

The signal $S_0$ received by the modem after transmission through the ionosphere is processed in a channel estimator 1 whose function especially is to carry out the extraction, by using an algorithm of varying complexity (for example of the MUSIC or Multiple Signal Classification type), of the estimated propagation parameters 2 during the reception of a polling waveform. A management software program 4 carries out what is known as a "matching process" type processing by crossing these estimated parameters with performance curves obtained for different types of modems and stored in one or more databases 3. Then, depending for example on a required quality of service QoS, 5, it determines a set 6 of traffic parameters to be implemented. Thus, the method determines the optimum bit rate value for transmitting data.

The term "quality of service" or QoS designates for example the bit error rate (BER), the end-to-end time of the transmission line, etc. The set of traffic parameters comprises for example the following parameters: the waveform used for data transmission, the user bit rate, the length of the interleaver or any other traffic parameter.

However, such a system is complicated and requires CPU power and memory size, the performance curves being multi-dimensional. Thus, for a given transmission bit rate Di, the bit error rate BER is expressed as a function of the signal-to-noise ratio, the value of the Doppler spread and the temporal spread of each path, the amplitude and the number of these paths etc. Furthermore, a channel estimation algorithm lacking high resolution would give rise to some uncertainty in the bit error rate in a ratio of 1 to 100. This indirect method in which the estimation of the propagation parameters is separated from the performance tables therefore proves to be complex and of low efficiency.

In another simpler technique, the propagation parameters are reduced simply to the signal-to-noise ratio, or SNR. This technique however proves to be inoperative in the presence of multiple paths. Indeed, the signal-to-noise ratio does not represent quality of service for an ionospheric medium. There is a high variation in the quality of service QoS for a fixed SNR when the Doppler spread and/or the temporal spread is made to vary.

SUMMARY OF THE INVENTION

The object of the invention is based on a novel approach in which, in particular, a piece of information of "rough quality" associated with a propagation channel is coupled with a protocol for the automatic selection of a parameter representing the desired quality of service. The method relies especially on the real-time estimation of the propagation channel. This is done by determining the estimated equalization error and by deducing the value of the bit rate from this estimated error as a function of the required quality of service given at the modem.

The invention relates to a method for determining at least one traffic parameter in a data transmission system comprising at least one transmitter and one receiver, said receiver comprising a modem with equalizer. The method comprises at least the following steps:

determining at least one piece of data given by the equalizer such as the equalization error $E_i$, determining one or more traffic parameters in taking account of the data provided, a fixed quality of service QoS and a relationship linking the quality of service and the equalization error $E_i$.

The traffic parameter determined is for example the transmission bit rate Di.

The method comprises for example a step in which the value of the equalization error is averaged.

The relationship linking the required quality of service and the equalization error $E_i$ may be given in the form of a database obtained for different modems with equalizers, the database being pre-established or built during operation.

The relationship is formed for example by different bit rate values corresponding to intervals of given values of bit error rate and averaged equalization error.

The method may use an ALE type protocol with which it is possible to obtain several frequency/bit rate pairs and a step for the selection of a frequency value and/or a bit rate value as a function of decision criteria.

The signals exchanged take, for example, the form of a frame comprising a traffic header, and the traffic parameter determined is transmitted in the waveform available in the header.

The invention also relates to a device adapted to the implementing the method according to the invention and comprising at least one modem with equalizer, wherein the device comprises a management card adapted to determining one or more traffic parameters in taking account of the equalization error $E_i$ given by the equalizer, a fixed value of quality of service QoS and a relationship linking the quality of service QoS and the equalization error $E_i$.

The invention has especially the following advantages:
  it offers a simple and reliable coupling device between the physical layer and the linking layer by which it is possible to follow the slow temporal variations of the transmission medium,
  it makes optimum use of a modem, in order to achieve the most efficient exploitation, during each month of the year, of the probability density function for the mean level of signal received, so as to give a very highly monthly average bit rate as compared with a system that is not adaptive in terms of bit rate,
  it does not consume radio resources, except in the transmission of a header that is generally slightly longer than necessary (one or more seconds) so as to make the average of the channel estimator more reliable; indeed, the parameter such as the bit rate to be adjusted automatically before and during transmission is sent in the already available waveform of the traffic header,
  it avoids the extraction of the propagation parameters,
  it enables the automatic selection, for a given traffic frequency, of the value of the bit rate that corresponds to a requisite quality of service, independently of the conditions of propagation and irrespectively of the serial waveforms used for the header and the traffic.

BRIEF DESCRIPTION OF THE DRAWINGS

Other features and advantages of the invention shall appear more clearly from the following description of exemplary embodiments given by way of an illustration that in no way restricts the scope of the invention. Of these figures.

MORE DETAILED DESCRIPTION

In order to provide for a clear understanding of the principle implemented in the invention, the following exemplary embodiments are given on a non-exhaustive basis.

They pertain to the automatic selection of the value of the data bit rate Di for HF transmission, in using the equalization error value $E_i$, estimated and averaged if necessary, obtained by a serial modem with equalizer.

Figure 1:
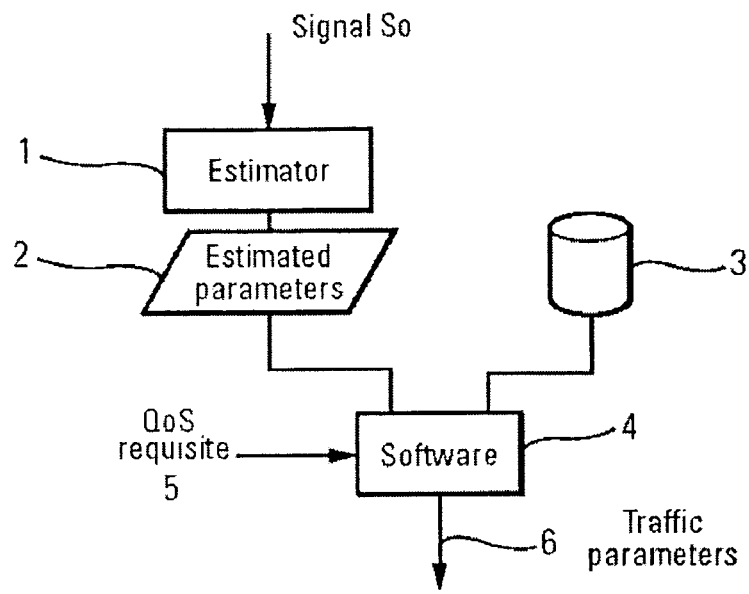
FIG. 1 is a drawing describing the steps implemented according to the prior art.
Figure 2:
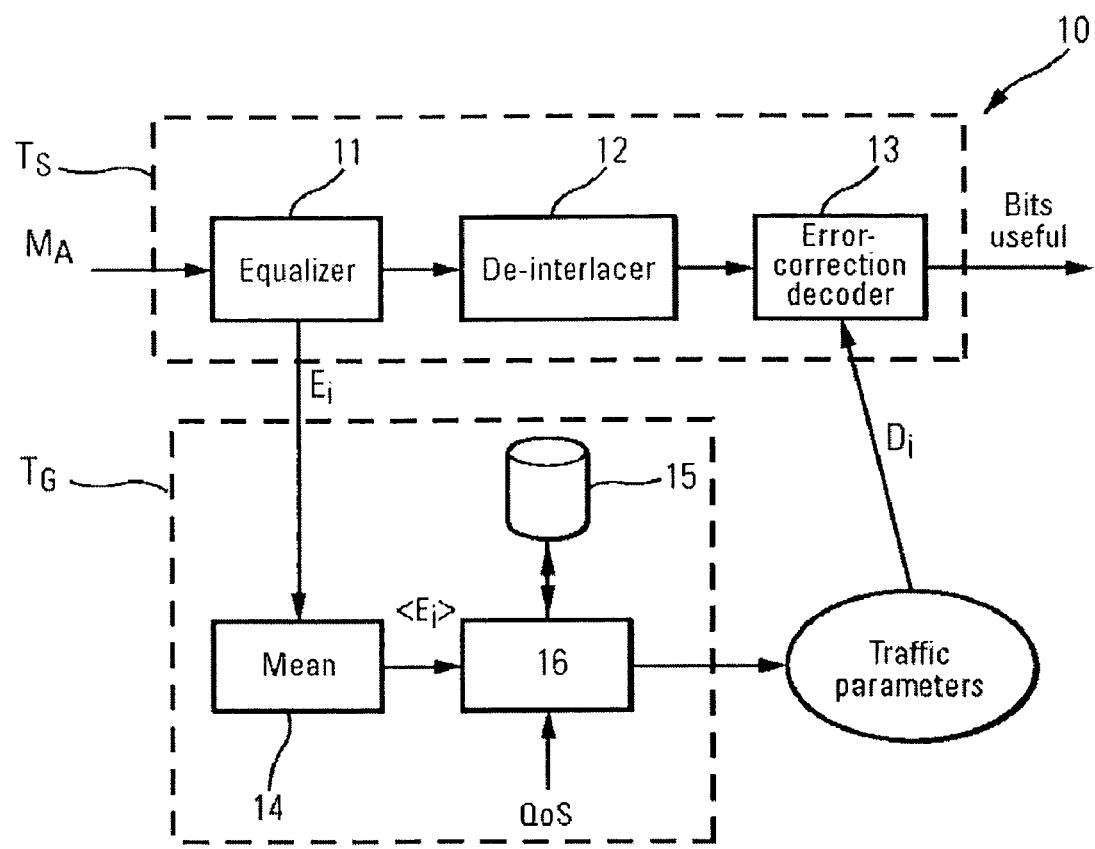
FIG. 2 shows a reception device according to the invention and the interaction between its different elements, FIG. 3 exemplifies curves by which the decision thresholds used in the method can be determined.

FIG. 2 describes an exemplary reception device used to implement the different steps of the method according to the invention. The transmitted message $M_A$ is received, after it has crossed the ionosphere, in a modem 10 comprising a signal-processing card TS and a management card TG communicating with each other. The signal-processing card TS comprises for example an equalizer 11, a de-interleaver 12 and an error correction decoder 13. The management card TG comprises, if necessary, an averaging device 14 adapted to taking an average of a parameter, a database 15 and a software program 16 adapted to determining different traffic parameters.

The signal $M_A$ is transmitted to the equalizer 11 which processes it to determine the value of the equalization error $E_i$. This value $E_i$ is transmitted to the management card TG which uses an adapted software program to take an average $<E_i>$, for example on several consecutive modem frames during the reception of the header by the recipient of the traffic. From this averaged value $<Ei>$, the database 15 and the knowledge of the quality of service parameter or parameters to be complied with, the software program 16 deduces the optimum bit rate value that will be used to transmit the data $M_T$, for example the initial bit rate of the traffic that follows the call-with-acknowledgement protocol. The traffic parameters thus determined, for example the bit rate, are transmitted to the signal-processing card TS.

Furthermore, the signal MA passes through a de-interleaver 12, and then an error-correction decoder 13 which also receives the value of the optimum bit rate Di coming from the management card TG. The signal-processing card TS thus sends the useful bits comprising the value of the bit rate and the data representing the information to be transmitted.

The signal exchanged and transmitted takes, for example, the form of a frame comprising a header and a zone intended for information. The waveform used for the transmitted signal includes, for example, an initial training sequence, i.e. known modulation symbols distributed in the waveform in "syncho-frame" blocks and/or "mini-probes". The modem used on the receiver side is, by nature, a multiple bit rate receiver. The waveform may be of the STANAG (NATO S STAndardisation AGreement) 4285 type or STANAG 4539 type, or any other mode using a high-bit-rate modem used in multiple-service mode.

The database 15 contains, for example, decision thresholds used to select the bit rate as a function of the bit error rate (BER) and the estimated value of the equalization error.

Figure 3:
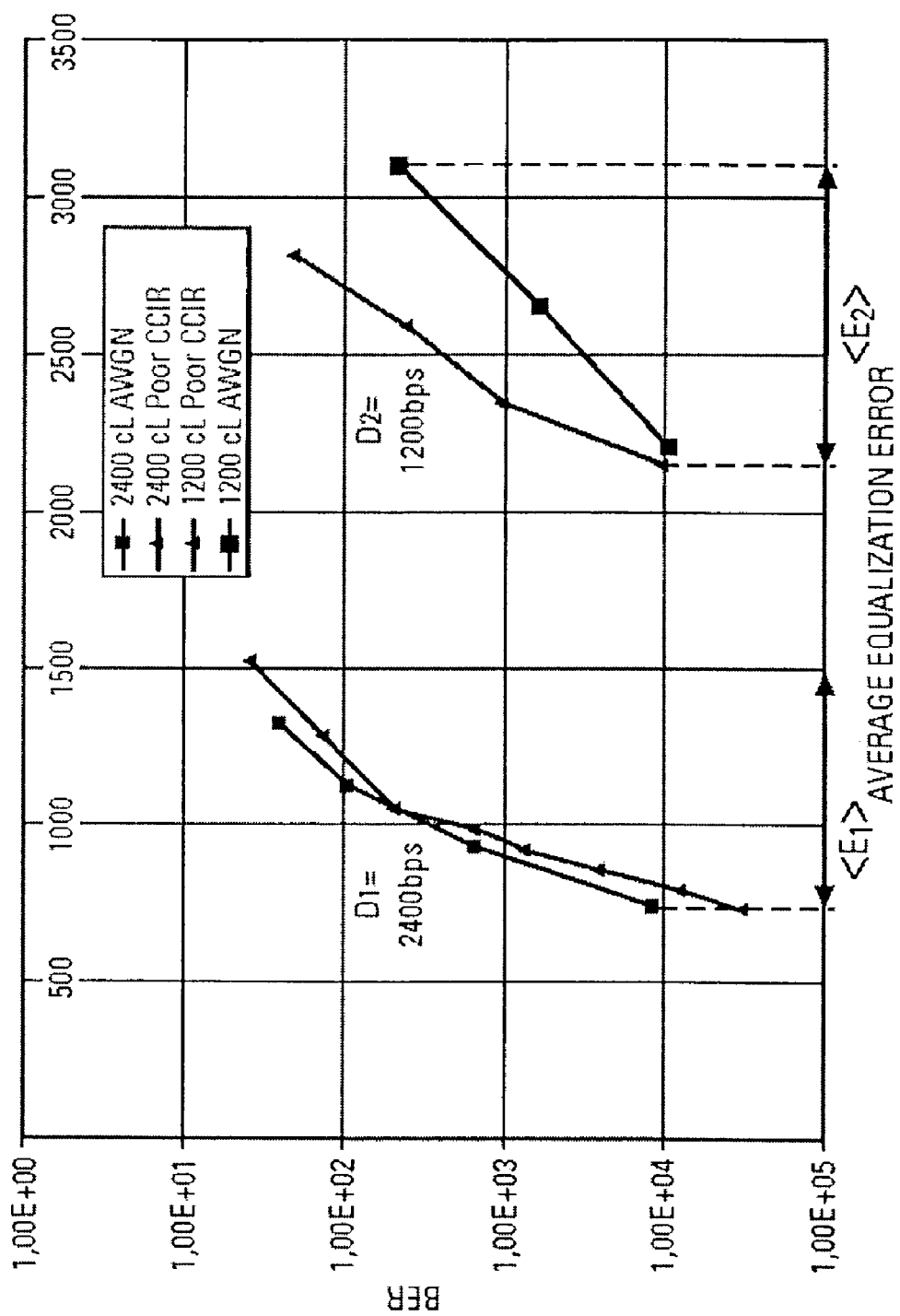

FIG. 3 shows two curves, each corresponding to a bit rate value $D_1$, $D_2$. These bit rate curves have been obtained for an AWGN (Additive White Gaussian Noise) and a non-stationary propagation channel known as a "poor CCIR" with two paths spaced out by one millisecond and having the same amplitude, which vary according to independent Rayleigh laws with a Doppler spread (measurement of the fading speed) of 1 Hz each.

Each of these curves $D_1$, $D_2$ has an associated interval $<E_1>$, $<E_2>$ of values for the averaged estimated equalization error. This error value is standardized by the power of the signal received. The range of variation of this equalization error depends, for example, on the implementation.

Thus, depending on the value $<E_i>$ measured and on the bit error rate BER to be complied with, the management card software program determines the optimum bit rate value Di. In FIG. 3, the bit rate values $D_1$, $D_2$ correspond to 1200 bps and 2400 bps.

These curves are obtained for several types of modem and stored in the table or database.

Advantageously, the duration of the header of the frame is fixed so that it lasts for a sufficient length of time. For example, a minimum value of one second will be chosen so as to reduce the variants of the measurement and integrate the fast fading phenomenon.

Figure 4:
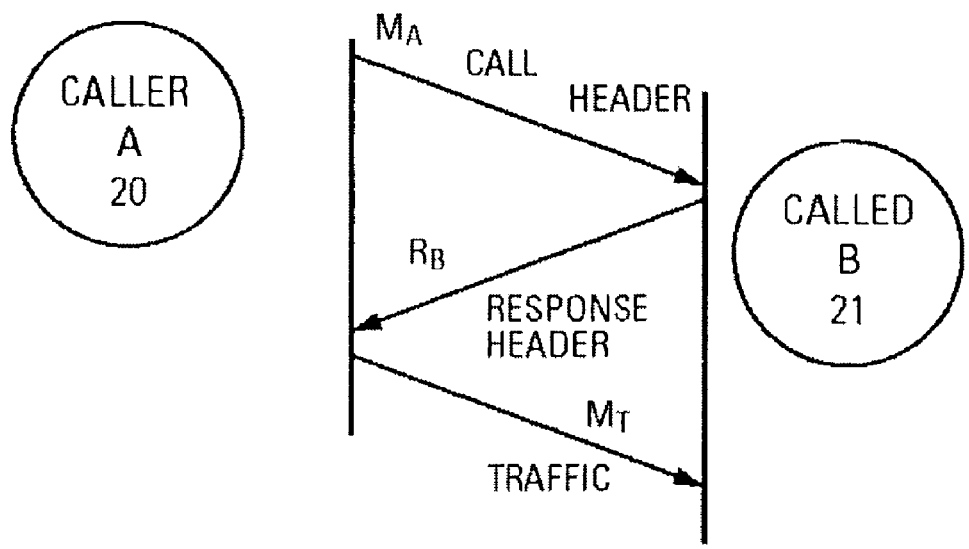
FIG. 4 is a block diagram of the data exchanges between a caller and called party.
Figure 5:
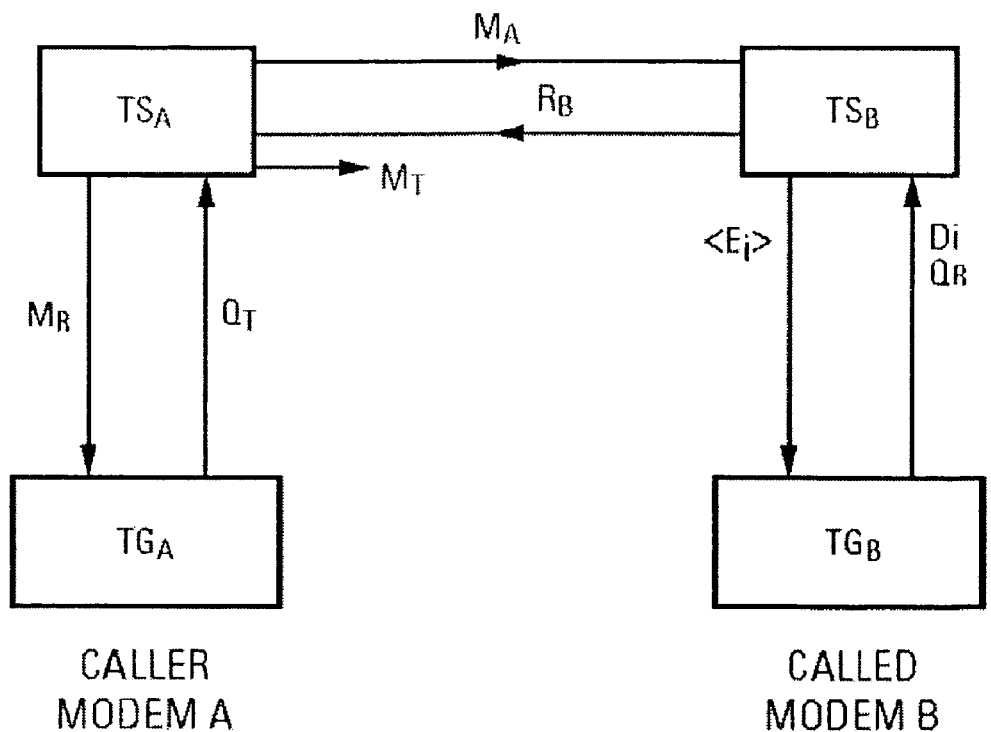
FIG. 5 shows the same exchanges at the level of the processing cards.

FIGS. 4 and 5 give a diagrammatic view of the exchange protocol between a caller A and a called party B using the method according is to the invention. This exchange protocol consists, for example, of what is known as the pre-polling protocol (call header message $M_A$ from A to B and response header message $R_B$ from B to A) during which, in particular, the traffic parameters to be used are determined followed by a data transmission protocol (message $M_T$ from A to B).

The pre-polling protocol comprises a call header transmitted from a caller A using a modem 20 to a recipient B itself equipped with a modem 21, and a response header $R_B$ from B to A that contains the data and the traffic parameters determined in following the steps of the method according to the invention. Each of the modems is equipped with a signal-processing card respectively referenced $TS_A$, $TS_B$ and a management card respectively referenced $TG_A$, $TG_B$. These cards communicate with each other according to the sequences described here below (FIG. 5).

On reception of the call MA sent out by A, the signal-processing card $TS_B$ determines the estimate $<E_i>$ of the equalization error value which it can average, and sends this value to the management card $TG_B$. This card determines the optimum bit rate value Di for the data transmission, by using the bit error rate BER value required, the value $<Ei>$ and the databases giving the relationship between BER and $<Ei>$, mentioned for example in FIG. 3.

This parameter Di is transmitted, simultaneously with a transmission request $Q_R$ for transmission of the response from $TG_B$ to $TS_B$. The signal-processing card $TS_B$ sends a response $R_B$ to the caller A, that is received by the signal-processing card $TS_A$. This card $TS_A$ sends a "message received" signal $M_R$ to the management card $TG_A$ which then has the optimum bit rate value Di that it must use to transmit data in the subsequent part of the traffic. The card $TG_A$ then sends out the traffic transmission request $Q_T$ containing the data and the configuration of the modem, namely the values of traffic parameters to be used for the messages $M_T$ sent from A to B.

Without departing from the framework of the invention, the method is integrated into an ALE (Automatic Link Establishment) type automatic search protocol. A protocol of this kind enables, especially, a search for an unoccupied and active traffic frequency that meets a criterion of acceptance on the basis of the "matching process" described in the method, namely the correspondence, firstly, between the averaged equalization error and, secondly, the traffic parameters, such as the waveform, the bit rate value and the interleaver, which enable the required quality of service to be obtained.

For this purpose, on the called party's side, for each of the frequencies Fi to be determined, the method determines the bit rate value Qi in using the value of the equalization error $E_i$. This leads to several values of pairs $(F_1, D_1)$, $(F_2, D_2)$, . . . and to the application, to these different pairs, of a criterion of acceptance of the frequency or bit rate value.

For example, if a bit error rate BER value in the range of $10^{-4}$ is taken for QoS, and if the waveform and the interleaver are fixed initially, the criterion chosen may be that of accepting the first frequency for which the bit rate (at output of the correspondence table) is greater than a given bit rate threshold. For an audio channel waveform, this corresponds to 1200 useful bps in FEC mode.

The method and the device according to the invention can be applied for example to the following three types of transmission and multiple bit rate traffic:

"Error-free" data transmission with ARQ (Automatic Request Query) protocol,

Data transmission in FEC (Forward Error Correction), bit rate ranging from bit rate_min to bit rate_max with, for example, bit rate_min $\geq$75 bps and bit rate_max $\leq$9600 bps, the transmission of enciphered vocoded voice transmission at a bit rate equal to 800 or 2400 bps typically for the respective STANAGs 4479 and 4198 (LPC10e).

For these three types of traffic, the device according to the invention enables the adapting of the bit rate by choosing the user bit rate, when the link is set up (call header with response that acknowledges the call), that most closely meets the requisite quality of service requirements:

Automatic choice of the initial bit rate of the ARQ transmission,

Automatic choice of the FEC bit rate,

Automatic choice of the vocoder.

Without departing from the framework of the invention, the method and the device described here above may use any traffic waveform, such as those used in OFDM modulation/demodulation, FSK modulation/demodulation, spread-spectrum modulation/demodulation and different-channel traffic waveforms etc., after the call-response phase. The call-response phase alone uses a modem with equalizer.

What is claimed is:

1. A method for determining at least one traffic parameter in a data transmission system comprising at least one transmitter and a receiver, said receiver including a modem with an equalizer and a decoder as part of a signal processing card, and a management card, the method comprising:

transmitting via a high frequency channel reflected by ionosphere an initial training sequence by using known modulation symbols to said equalizer;

first determining at least one piece of data given by the equalizer, the at least one piece of data including an equalization error $E_i$ of the initial training sequence;

second determining in said management card at least one traffic parameter in taking account of the data provided, a required quality of service QoS, and a relationship linking the required quality of service and the equalization error $E_i$;

transmitting said at least one traffic parameter to said decoder; and transmitting traffic information, after said decoder is configured based on said at least one traffic parameter, from said decoder to a user not through said management card.

2. A method according to claim 1, wherein the at least one traffic parameter determined in said second determining includes a transmission bit rate Di.

3. A method according to one of the claims 1 or 2, further comprising:

averaging the equalization error $E_i$ so as to obtain $<E_i>$.

4. A method according to claim 1, wherein the relationship linking the required quality of service QoS and the equalization error $E_i$ is given in the form of a database obtained for different modems with equalizers, the database being pre-established or built during operation.

5. A method according to claim 1, wherein the relationship is formed by different bit rate values corresponding to intervals of given values of bit error rate BER and averaged equalization error $<E_i>$.

6. A method according to claim 1 further comprising:

using an Automatic Link Establishment (ALE) type protocol to obtain several frequency/bit rate pairs; and selecting a frequency value and/or a bit rate value as a function of decision criteria.

7. A method according to claim 1, wherein the signals exchanged take a form of a frame comprising a traffic header, and wherein the at least one traffic parameter determined is transmitted in a waveform available in the header.

8. A use of the method according to claim 1, for the transmission of data in the High Frequency (HF) range.

9. The method according to claim 3, wherein in the averaging, the average equalization error $<E_i>$ is standardized by a power of the received signal.

10. The method according to claim 1, wherein in the transmitting, a pre-polling protocol is sent from the at least one transmitter to the receiver, and the method further comprises:

responding to the at least one transmitter with the at least one traffic parameter.

11. A device to determine at least one traffic parameter in a data transmission system comprising:

at least one transmitter;

at least one receiver configured to receive information via a high frequency channel reflected by ionosphere, the receiver comprising at least one modem having a signal processing card, the signal processing card including an equalizer and a decoder; and a management card configured to determine at least one traffic parameter in taking account of an equalization error $E_i$ given by the equalizer of an initial training sequence, a required value of quality of service QoS, and a relationship linking the quality of service QoS and the equalization error $E_i$, wherein said decoder is configured to transmit information to a user not through said management card.

12. A device according to claim 11, further comprising a database integrating the relationship set up between the fixed value QoS and the equalization error $E_i$.

13. The device according to claim 11, wherein the equalizer is configured to average the equalization error $E_i$ so as to obtain an average equalization error $<E_i>$, and is further configured to standardize the average equalization error $<E_i>$ by a power of the received signal.

14. The device according to claim 11, wherein the management card is further configured to respond to a pre-polling protocol by transmitting to the transmitter the at least one traffic parameter.

* * * * *